(12) United States Patent
Dillingham et al.

(10) Patent No.: US 12,007,265 B2
(45) Date of Patent: Jun. 11, 2024

(54) METHOD AND DEVICE FOR MEASURING MINUTE VOLUME OF LIQUID

(71) Applicant: BRIGHTON TECHNOLOGIES LLC, Cincinnati, OH (US)

(72) Inventors: Raymond Giles Dillingham, Cincinnati, OH (US); Timothy James Barry, Cincinnati, OH (US); Michael Anthony Geren, Mason, OH (US); Andrew Davison Gilpin, Cincinnati, OH (US)

(73) Assignee: BRIGHTON TECHNOLOGIES LLC, Cincinnati, OH (US)

( * ) Notice: Subject to any disclaimer, the term of this patent is extended or adjusted under 35 U.S.C. 154(b) by 34 days.

(21) Appl. No.: 17/676,553

(22) Filed: Feb. 21, 2022

(65) Prior Publication Data
US 2022/0221320 A1    Jul. 14, 2022

Related U.S. Application Data (63) Continuation of application No. 16/611,213, filed as application No. PCT/US2018/031100 on May 4, 2018, now abandoned.
(Continued)

(51) Int. Cl.
*G01F 22/02*   (2006.01)
*B41J 2/21*    (2006.01)
(Continued)

(52) U.S. Cl.
CPC ............. *G01F 22/02* (2013.01); *G01B 11/08* (2013.01); *G01B 11/255* (2013.01);
(Continued)

(58) Field of Classification Search
CPC ..... G01F 22/02; G01F 22/00; G01N 21/8507; G06T 7/62; G01B 11/08; G01B 11/255; B01L 3/021
(Continued)

(56) References Cited

U.S. PATENT DOCUMENTS 8,474,306 B1 *   7/2013   Behroozi ............... G01N 13/02
                                                       73/64.52
2003/0080143 A1 *  5/2003  Kale .................... G01F 25/0092
                                                         222/1
(Continued)

FOREIGN PATENT DOCUMENTS

CN     103703085 A  *  4/2014  ............. A61L 15/24
CN     105452842 A  *  3/2016  ............ A61B 5/1071
(Continued)

OTHER PUBLICATIONS

Translation JP-2004288467 (Year: 2004).*
Translation JP-2007064967 (Year: 2007).*

*Primary Examiner* — Peter J Macchiarolo
*Assistant Examiner* — Monica S Young
(74) *Attorney, Agent, or Firm* — Jenei LLC (57) ABSTRACT

A method and test apparatus determines a volume of a droplet of liquid. The test apparatus deposits a drop of liquid to be measured on a surface that provides a known contact angle with the liquid under the deposition conditions used, thereby establishing one of: (i) an advancing, (ii) a receding, and (iii) an intermediate contact angle. The test apparatus images the drop. The test apparatus measures a dimension of height or diameter of the drop. In one embodiment, the test apparatus calculates a volume of the drop of liquid from the relationship of the contact angle to one or more parameters selected from the maximum height, the diameter of the contact patch, the radius of curvature, or the cross sectional area of the drop.

23 Claims, 3 Drawing Sheets

Related U.S. Application Data (60) Provisional application No. 62/502,024, filed on May 5, 2017.

(51) Int. Cl.

| | | |
|---|---|---|
| *G01B 11/06* | (2006.01) | |
| *G01B 11/08* | (2006.01) | |
| *G01B 11/255* | (2006.01) | |
| *G01F 22/00* | (2006.01) | |
| *G01F 25/00* | (2022.01) | |
| *G01N 13/02* | (2006.01) | |
| *G01N 21/85* | (2006.01) | |
| *G01N 35/10* | (2006.01) | |
| *G06T 7/62* | (2017.01) | |

(52) U.S. Cl.
CPC .......... *G01N 21/8507* (2013.01); *G06T 7/62* (2017.01); *B41J 2/2142* (2013.01); *G01B 11/0608* (2013.01); *G01F 22/00* (2013.01); *G01F 25/0084* (2013.01); *G01N 2013/0208* (2013.01); *G01N 35/1016* (2013.01)

(58) Field of Classification Search
USPC .......................................................... 73/149
See application file for complete search history.

(56) References Cited

U.S. PATENT DOCUMENTS

| | | | | |
|---|---|---|---|---|
| 2005/0186873 | A1* | 8/2005 | Wang | D06M 23/08 |
| | | | | 442/79 |
| 2008/0238973 | A1* | 10/2008 | Yamanobe | B41J 29/38 |
| | | | | 347/14 |
| 2010/0024529 | A1* | 2/2010 | Dillingham | G01N 13/02 |
| | | | | 73/64.52 |
| 2011/0311764 | A1* | 12/2011 | Hulseman | B22F 5/007 |
| | | | | 428/141 |
| 2013/0021400 | A1* | 1/2013 | Tamagawa | B41J 2/2139 |
| | | | | 347/15 |
| 2015/0211973 | A1* | 7/2015 | Friedrich | G01N 13/02 |
| | | | | 73/64.52 |
| 2019/0285530 | A1* | 9/2019 | Behroozi | G01N 13/02 |
| 2021/0255019 | A1* | 8/2021 | Han | G01F 22/00 |

FOREIGN PATENT DOCUMENTS

| | | | | | |
|---|---|---|---|---|---|
| CN | 108291910 | A | * | 7/2018 | ............ B01L 3/502 |
| CN | 110687018 | A | * | 1/2020 | ............ G01N 13/00 |
| DE | 4404276 | C1 | * | 3/1995 | ............ G01N 13/02 |
| JP | 2004288467 | A | * | 10/2004 | |
| JP | 2005119139 | A | * | 5/2005 | |
| JP | 2007064967 | A | * | 3/2007 | |
| JP | 2009162759 | A | * | 7/2009 | ........... G01B 11/255 |
| JP | 2015200539 | A | * | 11/2015 | |
| JP | 6677735 | B2 | * | 4/2020 | ................ B41J 2/06 |
| WO | WO-2016065369 | A1 | * | 4/2016 | ............ G01N 13/02 |

* cited by examiner

METHOD AND DEVICE FOR MEASURING MINUTE VOLUME OF LIQUID

CROSS-REFERENCE TO RELATED APPLICATIONS

This application is a continuation of U.S. Nonprovisional patent application Ser. No. 16/611,213 entitled "METHOD AND DEVICE FOR MEASURING MINUTE VOLUME OF LIQUID", filed Nov. 5, 2019, which claims the benefit of priority under 35 U.S.C. § 119(e) to U.S. Provisional Patent Application Ser. No. 62/502,024 entitled "METHOD AND DEVICE FOR MEASURING MINUTE VOLUME OF LIQUID", filed May 5, 2017, and to PCT Application No. PCT/US2018/031100 entitled "METHOD AND DEVICE FOR MEASURING MINUTE VOLUME OF LIQUID," filed May 4, 2018, all of which are hereby expressly incorporated by reference herein for any purpose.

BACKGROUND OF THE INVENTION

1. Field of the Invention

The field of art disclosed herein pertains generally relates to a device and method to dispense small droplets of liquid, and more particularly to measuring the volume of dispensed droplets.

2. Description of the Related Art

Liquid volumes may be measured in several ways. A graduated cylinder or pipette may be used to directly measure a liquid volume. Alternatively, the mass of a quantity of a liquid may be measured and then divided by the density to obtain the volume. These methods are less convenient for small volumes of liquid. The precision of a graduated container is limited by the subjectivity of the measurement process. Using a mass measurement for small volumes requires a sensitive and expensive balance. These methods do not lend themselves to rapid and convenient use.

SUMMARY OF THE INVENTION

In one aspect, the present disclosure provides for a device and method to dispense small droplets of liquid, and more particularly to measuring the volume of dispensed droplets.

In one embodiment, the present invention provides for a method and test apparatus for determining a volume of a droplet of liquid. In one embodiment, the test apparatus deposits a drop of liquid to be measured on a surface that provides a known contact angle with the liquid under the deposition conditions used, thereby establishing one of: (i) an advancing, (ii) a receding, and (iii) an intermediate contact angle.

In another embodiment, the test apparatus images the drop. In another embodiment, the test apparatus measures a dimension of height or diameter of the drop or both. In another embodiment, the test apparatus determines a volume of the drop of liquid from the relationship of the contact angle to one or more parameters selected from the group consisting of the maximum height, the diameter of the contact patch, the radius of curvature, and the cross sectional area of the drop.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

A liquid drop, when deposited onto a surface and allowed to come to equilibrium, forms a symmetrical shape that is determined by the balance of several forces: the liquid surface tension, the solid surface energy, the gravitational force on the liquid, and the strength of attraction between the liquid and the surface on which it rests. If the drop is small, gravitational forces are small in relation to the surface and interfacial tensions and can be ignored. In this case the drop assumes a spherical shape, and the shape of the drop is defined by the contact angle θ. This is the angle between the surface and a tangent to the drop at the point of intersection of the drop with the surface. The contact angle is defined as the angle formed by the intersection of the liquid-solid interface and the liquid-vapor interface (geometrically acquired by applying a tangent line from the contact point along the liquid-vapor interface in the droplet profile). The interface where solid, liquid, and vapor co-exist is referred to as the "three-phase contact line". A small contact angle is observed when the liquid spreads on the surface, while a large contact angle is observed when the liquid beads on the surface. More specifically, a contact angle less than 90° indicates that wetting of the surface is favorable, and the fluid will spread over a large area on the surface; while contact angles greater than 90° generally means that wetting of the surface is unfavorable so the fluid will minimize its contact with the surface and form a compact liquid droplet.

Figure 1:
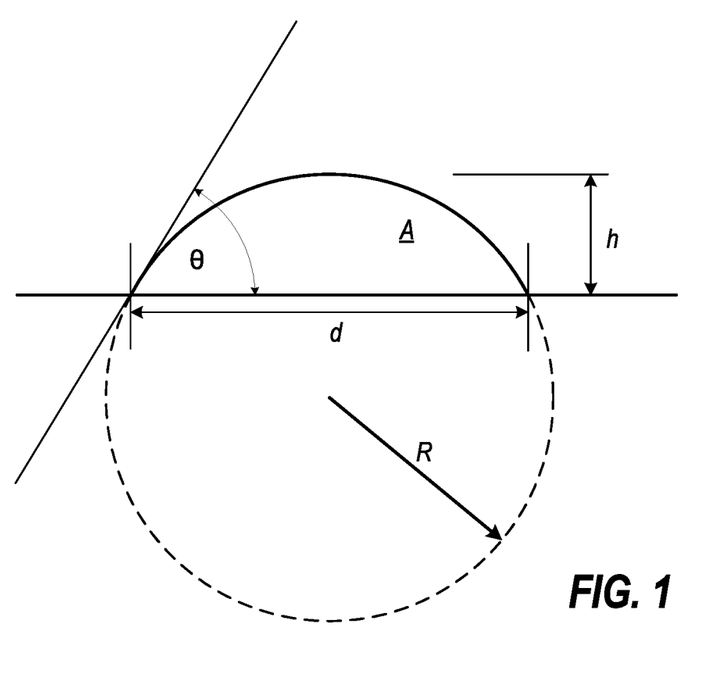
FIG. 1 illustrates a diagram of a contact angle formed between a liquid drop and a surface, which is the angle between the surface and a tangent to the liquid drop at the point of contact with the surface, according to one or more embodiments.

FIG. 1 illustrates a diagram of a small liquid drop on a surface. The dashed line represents a circle with the same radius of curvature R as the spherical drop. Angle θ is the contact angle, d is the diameter of the contact patch, h is the maximum height of the drop above the surface, and A is the maximum cross-sectional area of the drop.

The relationship of the contact angle to the surface tension of the liquid and the substrate surface energy is defined by the Young equation:

$$\gamma_s = \gamma_{sl} + \gamma_l \cos\theta \qquad (1)$$

Where $\gamma_s$=substrate surface energy
$\gamma_{sl}$=substrate-liquid interfacial energy
$\gamma_l$=liquid surface tension In addition to depending upon the substrate surface energy, the liquid surface tension, and the substrate-liquid interfacial energy, the contact angle depends upon the way in which the liquid is deposited. As the liquid is slowly advanced across a previously unwet surface, it establishes the advancing contact angle. This is the largest contact angle that can exist between a given liquid-substrate pair. If the liquid is slowly removed from the surface after wetting, it establishes the receding contact angle. This is the lowest contact angle that can exist for a particular liquid-substrate pair. Other contact angles that are intermediate between the advancing and receding angles are also possible and depend on the exact way that a liquid is deposited. This implies that given a liquid and a substrate with consistent surface energies, and a consistent method for bringing the liquid into contact with the surface, the contact angle will be constant.

The relationship between a contact angle and the volume of a spherical drop is given by the following equations derived from basic trigonometry. If the base diameter of the drop and the contact angle are known:

$$V = \frac{\pi d^3 (2 - 3\cos\theta + \cos^3\theta)}{24\sin^3\theta} \quad (2)$$

If the height of the drop and the contact angle are known:

$$V = \frac{\pi h^3}{2}\left(\cot^2\frac{\theta}{2} + \frac{1}{3}\right) \quad (3)$$

These equations show that if one knows the contact angle of a drop on a surface and can simultaneously measure either the height or the base diameter, the volume of the drop can be precisely calculated. While Equations 2 and 3 are convenient; other relationships between the geometry of the drop, the contact angle, and the volume can be used to determine the volume. An example would be determination of the drop volume from the radius of curvature and the contact angle:

$$V = \frac{\pi R^3}{3}(1 + \cos\theta)^2 (2 + \cos\theta) \quad (4)$$

Or from the cross sectional area and the contact angle:

$$V = \frac{\pi}{3} A^{\frac{3}{2}} \frac{[(1 - \cos\theta)^2 (2 + \cos\theta)]^{\frac{1}{2}}}{\theta - \cos\theta\sin\theta} \quad (5)$$

This approach is not limited to liquid drops that are spherical due to small size. If drops are large enough that gravitational forces cause distortion such that the drops are no longer spherical, other equations are available that while not analytic expressions such as equations (2) through (5) still provide a reasonably accurate estimate of drop volume from contact angle, drop dimensions, and liquid density.

Figure 2:
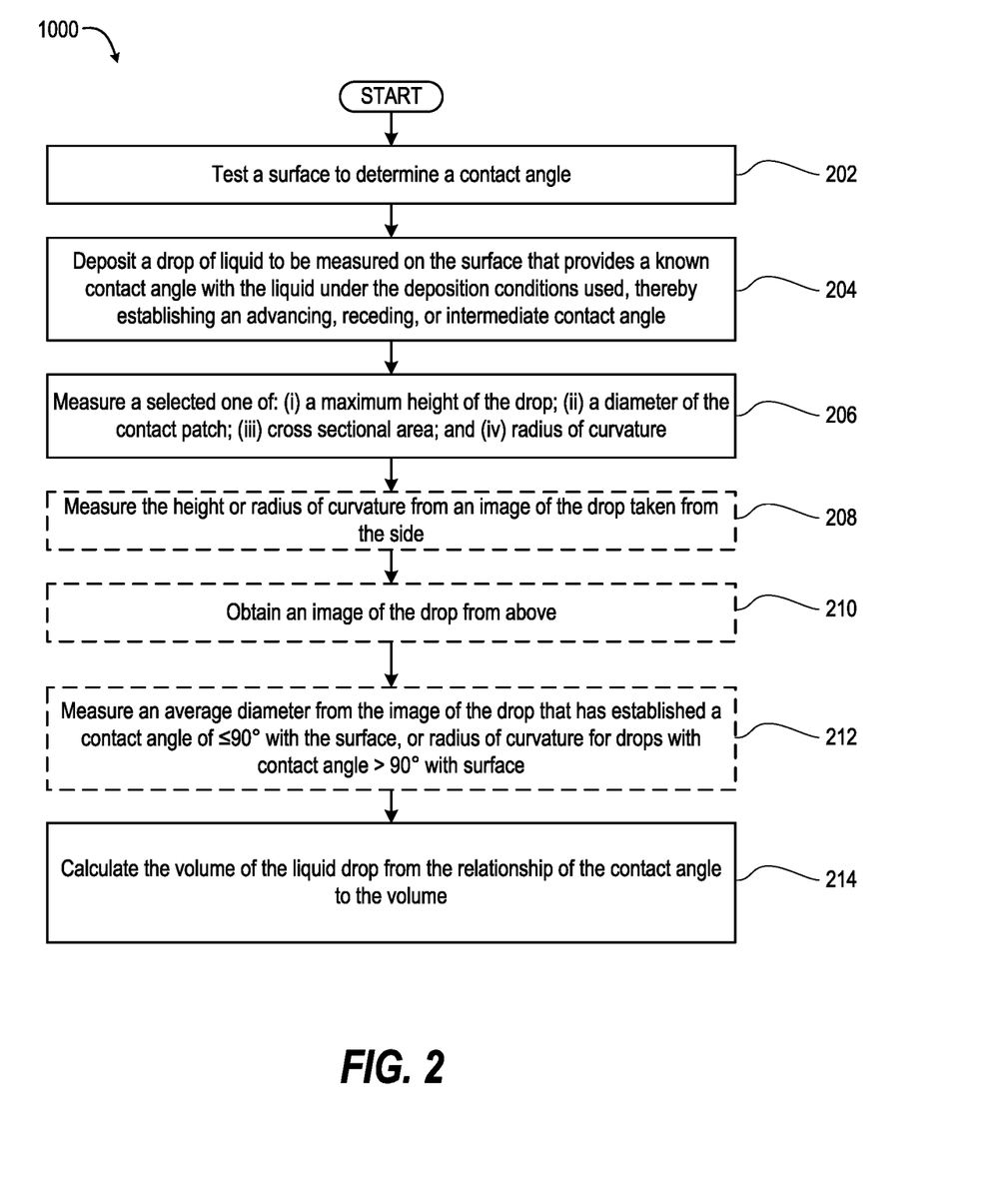
FIG. 2 illustrates a flow diagram of a method of obtaining the volume of a liquid drop on surfaces, according to one or more embodiments.

FIG. 2 illustrates a method 200 for accurately measuring the volume of a small drop of liquid. In one or more embodiments, the method 200 includes testing a surface with a liquid to determine a contact angle that is characteristic of the surface and the method by which the liquid is brought into contact with the surface (block 202). This contact angle could be an advancing angle, a receding angle, or an intermediate angle. Method 200 includes depositing a drop of liquid to be measured on a surface that provides a known contact angle with the liquid under the deposition conditions used, thereby establishing an advancing, receding, or intermediate contact angle (block 204). Method 200 includes measuring a selected one of: (i) a maximum height of the drop, (ii) a diameter of the contact patch, (iii) the cross sectional area of the liquid drop, and (iv) the radius of curvature (block 206). By way of an example, method 200 can include measuring the height of the drop or the radius of curvature, for example from an image taken from the side or from some other convenient method (block 208). Similarly, method 200 can include obtaining an image of the drop from above to determine the average diameter of the contact patch (block 210). If the liquid drop has established a contact angle of >90° with the surface and the contact patch is obscured in a top-down view, the radius of curvature can be determined from the maximum drop diameter. Method 200 includes calculating the volume of the liquid drop from the relationship of the volume to the contact angle and either the height, contact patch diameter, major diameter of the drop, radius of curvature, or cross sectional area using the appropriate equation (block 214). For example, volume can be calculated from the expected contact angle and either Equation 2, 3, 4 or 5.

In one or more embodiments, the present invention provides for methods of determining a volume of a droplet of liquid dispensed from a test apparatus, the method comprising: (a) depositing an assumed volume of liquid to be measured from the test apparatus as a drop onto a calibrating reference surface, wherein the calibrating reference surface provides for a known contact angle with the drop of liquid under the deposition conditions used; (b) establishing a known contact angle with the drop of liquid selected from the group consisting of: (i) an advancing contact angle, (ii) a receding contact angle, and (iii) an intermediate contact angle; (c) measuring a dimension of the drop of liquid, wherein the dimension measured is selected from the group consisting of (i) a maximum height of the drop, (ii) a diameter of the contact patch, (iii) radius of curvature, and (iv) cross sectional area; and (d) calculating the volume of the drop of liquid from the relationship of the known contact angle to the measured dimension. In one or more embodiments, the methods further comprise (e) determining the difference between the assumed volume and the calculated volume of the drop of liquid.

In one or more embodiments, the methods further comprise (e) correcting for the difference between the volume of liquid dispensed by the test apparatus and the assumed volume. In one or more embodiments, the correcting for the difference between the volume of liquid dispensed by the test apparatus and the assumed volume can be by calculating an error factor into test results obtained from the test apparatus onto test surfaces. In one or more embodiments, the correcting for the difference between the volume of liquid dispensed by the test apparatus and the assumed volume can be by adjusting the volume of liquid dispensed by the test apparatus to correct for the difference.

In one or more embodiments, the drop volume is adjusted by adjusting the time interval during which the respective valve is opened, the degree of opening of the respective valve and/or the pressure provided by the liquid pressurizing system (e.g. the defined pressure of pressurized gas provided by a compressed gas system).

Figure 3:
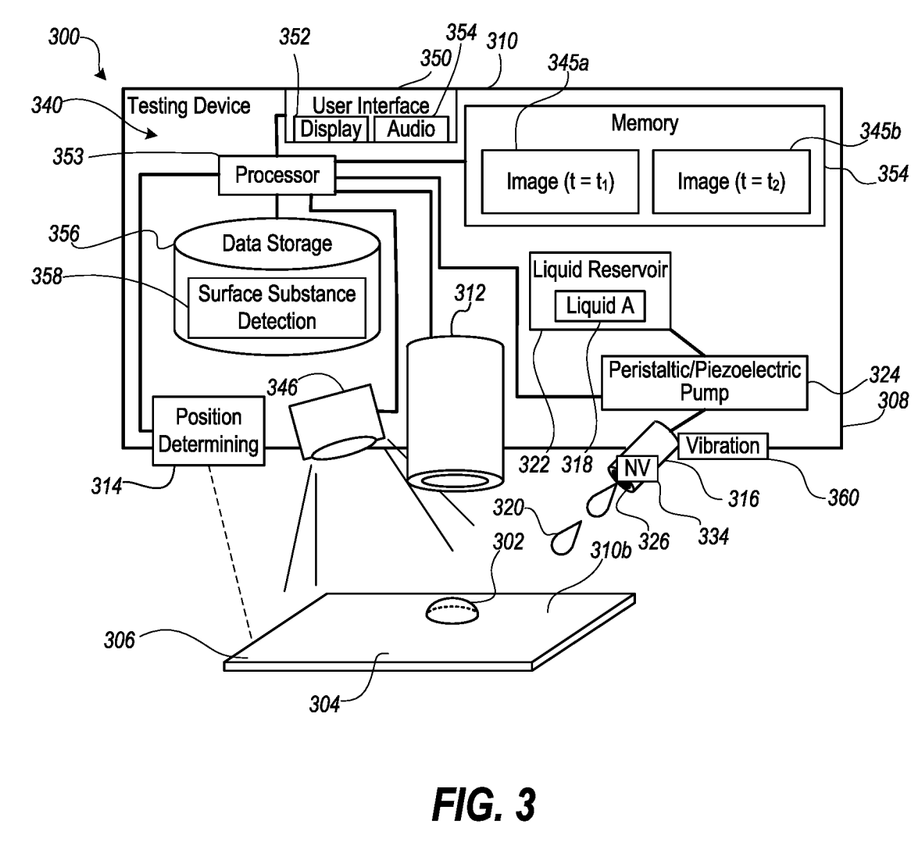
FIG. 3 illustrates a block diagram of a testing apparatus for determining a contact angle of liquid on a test article, according to one or more embodiments.

In one or more embodiments, the test apparatus comprises a processor 353 and nozzle valve orifice 334 that are adapted such that the liquid dispenser 316 is calibrated to dispense a liquid 318 as a drop volume that is calibrated to the assumed volume by adjusting the time interval during which the respective valve is opened, the degree of opening of the respective valve and/or the pressure provided by the liquid pressurizing system (e.g. the defined pressure of pressurized gas provided by a compressed gas system) according to the calculated volume of a drop deposited onto a calibrating reference surface.

In one or more embodiments, the calibrating reference surface of a known and consistent contact angle is prepared for use as a volume-determining device. In one or more embodiments, the calibrating reference surface comprises a material coated with an ink, polymer or other coating that has a consistent pre-determined contact angle. In one or more embodiments, the calibrating reference surface comprises a substrate coated with a polymer.

In one or more embodiments, the test apparatus is a device for depositing a known volume of liquid. In one or more embodiments, the test apparatus is a device for measuring the wetting characteristics of a liquid on a surface of a material comprising: a liquid dispensing component, a dimension determining component and a data generating component, wherein the liquid dispensing component is configured to deposit a volume of a liquid on the surface of the material; wherein the dimension determining component is configured to determine one or more dimensions of a liquid deposited on the surface wherein the data generating component is configured to analyze information based on the dimension determining component about one or more geometrical features of the volume of the liquid on the surface of the material.

The surface energy of a material can vary somewhat from sample to sample or from point to point due to the presence of small amounts of contamination or slight differences in the composition and the microstructure of the surface. Some materials and surface preparation methods provide more consistent surface energies than others. Using a standard material with a surface having a consistent and precisely known contact angle as a calibrating reference improves the precision of the technique. In one embodiment, calibrating references comprise polymer films, such as polypropylene or polyester. In one embodiment, the polymer films are inexpensive and disposable. In one embodiment, the polymer films are obtained in roll form or sheet form, which helps to protect the surface to be measured from contamination from contact or exposure. The calibrating reference polymer films can be oxidized or otherwise treated by techniques such as flame, corona, or plasma processes to generate a surface that gives a consistent contact angle having a convenient value. When carefully prepared, the polymer films generally show contact angles that are repeatable to within a few degrees or less. In one embodiment, the pre-prepared polymer sheets show contact angles that are repeatable to within 5, 4, 3, 2, 1, 0.75 or 0.5 degrees or less. Other surfaces that have proven to be convenient include polymer films and sheets, corona-treated polymer films and sheets, paper, fiber or cardstock (coated or bare), printed paper or cardstock, surfaces covered with a film or a coating such as paint, vapor deposited coating, or a self-assembled mono- or multilayer. In one or more embodiments, coatings having known surface properties may be used on a substrate wherein the substrate is selected from the group comprising paper, cardboard, containerboard, plastic, cellophane, textile, wood, metal, glass, mica plate, nitrocellulose, or concrete, preferably paper, cardboard, containerboard, or plastic. In one or more embodiments, coatings may be one or more compositions selected form the group consisting of polymers or metals of.

In one or more embodiments, the coating is applied by spray coating, inkjet printing, offset printing, flexographic printing, screen printing, plotting, contact stamping, rotogravure printing, spin coating, reverse gravure coating, slot coating, curtain coating, slide bed coating, film press, metered film press, blade coating, brush coating and/or a pencil, preferably by inkjet printing or spray coating.

Other convenient surfaces showing a consistent contact angle can be prepared by the user immediately prior to use, for instance by cleaning a surface by solvents, detergents, or abrasion, or some combination thereof; by peeling off a protective layer, or by removing a peel ply layer from a composite material immediately before use. The important characteristic is for such a surface to have a known and repeatable contact angle. While any surface with a known and reproducible contact angle can be used, surfaces having higher contact angles are advantageous for several reasons. As shown in Equation 1, surfaces having higher contact angles have lower surface energy. Lower surface energy surfaces are more practical for use as a volume-measuring device because they are more stable and resistant to contamination and reaction with the environment.

In one embodiment, the present innovation has demonstrated a particularly convenient approach of using card stock prepared by a printing process to provide a surface having a water contact angle of approximately 75° with a standard deviation of about 1°. When a batch of such cards are printed, the average contact angle returned by the surfaces of that particular batch is conveniently established by calibrating reference testing. Testing for each batch accounts for any lot-to-lot variation in materials or process that could affect the contact angle.

Surfaces having reproducible contact angles are particularly convenient for measuring the volume of liquid deposited by a device such as an ink jet printer or a surface energy-measuring device. One application involves confirming the volume of liquid deposited from a small valve for the purpose of measuring the wetting properties of a surface. This instrument deposits a drop of liquid, images the drop from above to determine the average diameter or area of the contact patch, and uses this information along with the assumed volume of liquid to calculate the contact angle. However, if the volume of the deposited liquid changes over time, for example due to drifts in the characteristics of the mechanism, the calculated contact angle will be in error. It is valuable to be able to regularly check and verify the volume of the deposited drop. This is done conveniently by depositing a drop on a surface of known contact angle, such as the surface of a composite calibrating reference material that has been recently exposed by removal of a peel ply or by some other method of cleaning, or a piece of cardstock that has printed with an ink to create a surface of consistent contact angle, then using Equation 2 above to calculate the precise volume. In this way the accuracy and precision of the deposited volume can be confirmed and adjusted if necessary.

A reference measurement of the wettability of the reference surface can be measured by any means know to the person skilled in the art. The wettability can be determined by contact angle goniometry. In one embodiment, the wettability is determined using sessile (or static) drop measurements. In another embodiment, the wettability is determined using advancing and/or receding contact angle measurements optionally measured using a Wilhelmy balance. In one embodiment, the advancing and receding contact angles of the calibrating reference material can be confirmed using the following two instruments and procedures:

(a) Tensiometer Test Method. Tensiometry as used herein, is a collection of methods used to measure the contact angle and wettability of a surface and involves a gravimetric measurement of the forces of interaction as a solid is contacted with a test liquid (Wilhelmy method). These forces of interaction are a dynamic measurement and reflect the interactions of the entire immersed article (wetted length). Forces are measured as the article is advanced into and out of a test liquid. From these measurements, both advancing and receding contact angles, respectively, can be calculated (Wilhelmy equation) in an indirect manner. In one embodiment, the Wilhelmy method may make use of a Dynamic Contact Angle Analyzer (DCA).

(b) Goniometer Test Method. Goniometry, as used herein, involves the optical observation of a sessile drop of test liquids on a solid substrate. Tangent angles are measured for each test liquid providing the direct measurement of a contact angle. One can establish an advancing, receding, or intermediate contact angle with a goniometer depending on how the liquid drop is deposited. These angles only reflect the average forces imparted from the area under the perimeter of the drop (the contact line) and not the bulk of the article. These angle calculations can be used to determine surface energies and corresponding components. In one embodiment, the goniometry involves a backlit drop of liquid that is optically imaged and the angle subtended by the drop at the point of solid-liquid contact is determined using machine vision algorithms.

In one or more embodiments, the present invention can establish an advancing, receding, or intermediate contact angle by varying the kinetic energy imparted to the deposited liquid drop. A drop deposited with a large amount of kinetic energy per unit volume establishes a contact angle close to the receding angle. A drop deposited with little or no kinetic energy per unit volume establishes a contact angle approaching the advancing angle. The amount of kinetic energy deposited can be modulated anywhere in between an advancing and receding contact angle. Therefore, the parameters of the liquid deposition device can therefore be adjusted such that a drop is deposited with mid-range kinetic energy per unit volume establishing a contact angle that is at or near the midpoint between the receding and advancing contact angles. Such an approach allows the deposition to be useful with materials having a broader range of surface properties.

In one or more embodiments, the test drop should be deposited under substantially the same deposition conditions of kinetic energy that were used to determine the characteristic contact angle of the calibrating reference surface.

Both goniometer and tensiometer test methods achieve similar results with the goniometer being of a small area and a static measurement. In another embodiment, Dyne solutions or pens containing these solutions may be used. Dyne solutions are chemical blends of various surface tensions that will either wet the surface, if the surface energy is high enough, or form into beads if the surface energy is below a predetermined threshold. The value determined using a dyne solution is termed the wetting tension of the surface. In some instances it is possible to use the wetting tension to calculate the characteristic contact angle of a surface.

In one or more embodiments, the present invention provides for an automatic or semi-automatic method for precisely adjusting the volume of liquid deposited by a device. If the diameter, height, radius of curvature, or cross sectional area of a droplet placed on a surface of known contact angle is different from the expected value based on an assumed volume of liquid, then the amount of deposited liquid can be increased or decreased until the desired diameter or height of drop matches the expected value.

Convenient levels of kinetic energies range from about 0.1-10 µJ for drops that are in the range of 0.1-5 µl total volume. In one embodiment, these impart total kinetic energies in the range of about 0.5-2 µJ to the drop.

The volume rate of flow of a liquid handling system is an important parameter that can be difficult to measure and control, especially when flow rates are low or intermittent. Examples where control of low or intermittent flow rates is important include ink jet, or "drop-on-demand" technology, printing systems, automated combinatorial chemistry devices, automated cell culture systems, and titrators. The methods and devices of the present invention can be used in the medical and biotechnology industries as well as other industries. Some examples of uses for precisely adjusting the volume of liquid deposited by a device include use for blood-cell-separation equipment, biochemical assays, chemical synthesis, genetic analysis, drug screening, an array of antigen-antibody reactions, combinatorial chemistry, drug testing, medical and biological diagnostics, and combinatorial chemistry. The methods and devices also have uses in electrochromatography, surface micromachining, laser ablation, inkjet printers, and mechanical micromilling. Liquid flow rates and dispensed volume can change in these systems due factors such as varying amounts of entrained air or varying temperature. Typical mass flow meters that depend on thermal conductivity of the liquid or some other property that varies with flow rate are not useful for these situations. In these situations, intermittent confirmation of flow or dispensed volume can be confirmed and adjusted if necessary by dispensing a small drop of liquid onto a surface of known contact angle and measuring a geometrical characteristic of the drop such as the diameter of the contact patch or the height.

In one example, U.S. Pat. No. 8,272,254, which is hereby incorporated by reference in its entirety, describes a device for measuring the contact angle of a liquid on a surface. The device uses a valve supplied with liquid from a pressurized reservoir to deposit a drop on a surface. This device then acquires an image of the drop and determines the diameter of the contact patch from the image. The contact angle then is calculated from the area or diameter of the drop and the assumed volume of liquid, which was previously determined through direct measurement of the liquid mass. If the actual liquid volume is different from the assumed volume, the calculated contact angle will be in error. This can happen when an air bubble is unintentionally introduced into the system during a refilling operation or perhaps due to dissolved air coming out of solution.

The accuracy can be confirmed by depositing a drop onto a surface that returns a known contact angle for the given deposition conditions, for example a piece of card stock that has been printed with an ink that gives a consistent and known contact angle. The contact angle is calculated by the instrument, assuming the original drop mass. An average of multiple measurements can be taken on the test surface to improve the accuracy. If the calculated contact angle is in error compared with the expected contact angle on the printed cardstock surface, the instrument can either change the value of drop volume used to calculate the contact angle, or adjust the volume of the deposited drop by adjusting the drop deposition parameters. This process can be repeated an often as desired to obtain any level of confidence in the accuracy of the deposited volume.

FIG. 3 illustrates a testing apparatus 300 for expeditiously determining a volume based on a known contact angle of a liquid drop 302 on a surface 304 of a test article 306. In particular, the testing apparatus 300 detects one or more geometrical features of the liquid drop 302, such as its height, cross-sectional area, radius of curvature, or diameter. Although dimensions of the liquid drops of any volume could be measured, it has been found advantageous to use drops whose dimensions are on the order of a 0.1 millimeter to 10 millimeters. In one embodiment, the drop dimensions are on the order of 0.5 millimeter to 5 millimeters. In one embodiment, the testing apparatus 300 is incorporated within a hand-held housing 308 to form a testing device 310. In one embodiment, a single, handheld device can be extremely convenient for use in a manufacturing environment on a variety surfaces and structures in a variety of orientations.

The testing device 310 positions an imaging sensor 312 such as video camera with telescopic optics at a known vantage point to the surface 304. The testing device 310 can include position determining component 314 that provide a physical reference or a sensed reference to the surface 304. A liquid dispenser 316 dispenses a liquid 318 as liquid droplets 320 along a trajectory toward the surface 304 to form and to impart a controllable amount of energy to the liquid drop 302. For example, the liquid 318 can be contained in a liquid reservoir 322 that is propelled by a peristaltic pump 324 through an orifice 326 of the liquid dispenser 316 that is sized to create liquid droplets 320 of a selected volume and at a selected velocity.

In one or more embodiments, the liquid is supplied from a pressurized reservoir capable of propelling the liquid out of the valve with the desired energy.

In one or more embodiments, the testing apparatus 300 comprises nozzle valve orifice 334 having a valve adapted for selectively blocking and allowing flow of liquid through the orifice. In one or more embodiments, the processor 353 and the nozzle valve orifice 334 are adapted such that the liquid dispenser 316 dispenses a liquid 318 as liquid droplets to the test surface with a flow rate less than about 50, 45, 40, 35, 30, 25, 20, 15, or 10 µl/s or less. In another embodiments, the processor 353 and the nozzle valve orifice 334 are adapted such that the liquid dispenser 316 dispenses a liquid 318 as liquid droplets to the test surface with a flow rate greater than about 0.1, 0.5, 1, 1.5, 2, 2.5, 3, 4, or 5 µl/s or more.

In one or more embodiments, the flow rate may be controlled by the processor 353 by, e.g., controlling and adjusting the degree of opening of the valve and/or the pressure provided by the liquid pressurizing system (e.g. the defined pressure of pressurized gas provided by a compressed gas system). In one or more embodiments, the processor 353 is adapted to adjust, for each of the testing apparatuses, the drop volume by adjusting the time interval during which the respective valve is opened, the degree of opening of the respective valve and/or the pressure provided by the liquid pressurizing system (e.g. the defined pressure of pressurized gas provided by a compressed gas system). In one or more embodiments, the processor 353 is adapted to auto-calibrate, for each of the liquid dispensers, the drop volume by adjusting the time interval during which the respective valve is opened, the degree of opening of the respective valve and/or the pressure provided by the liquid pressurizing system (e.g. the defined pressure of pressurized gas provided by a compressed gas system) according to the calculated volume of a drop deposited onto a calibrating reference surface.

The liquid dispenser 316 can control energy of the liquid droplets 320. High kinetic energies produce receding contact angles, while low kinetic energies produce advancing contact angles. A minimum amount of kinetic energy is necessary in order to compensate for air drag and gravity effects along the trajectory in order to impart sufficient energy to the liquid drop 302 and achieve the desired contact angle. For example, the kinetic energy can be controlled by the size of a nozzle valve orifice 334. For another example, the kinetic energy can be controlled by a variable amount of pressure exerted by the peristaltic pump 324. Pressures in the range of 0.1 pound per square inch (psi) up to 10 or more psi have been shown to be suitable. In one exemplary embodiment, a nozzle having 0.003-0.007" diameter sapphire orifice. This nozzle achieves a higher velocity at the same pressure as a stainless nozzle with a 0.015" stainless steel orifice.

In one or more embodiments, the testing apparatus also includes one, two or more liquid dispensers, which are each in fluid communication with the liquid reservoir arrangement, more particularly with at least one liquid reservoir of the liquid reservoir arrangement. Each of these liquid dispensers is adapted and arranged for applying a drop of a liquid stored in the liquid reservoir arrangement onto a surface of a test surface. In case two or more liquid dispensers are provided, they may be coupled to the liquid reservoir arrangement such that they apply the same liquid to different locations on the surface, e.g., in order to determine variations of the surface properties, or they could be coupled to different liquid reservoirs of the liquid reservoir arrangement storing different liquids.

Exemplary liquids that may be used with the device and method described here are water, dimethyl sulfoxide (DMSO), mixtures of formamide with glycol monoethyl ether, mixtures of water and ethanol, and other liquids with desirable wetting characteristics. In one embodiment, deionized ultra filtered water is used for testing purposes.

In one or more exemplary embodiments, the ambient, sample, and test solution temperatures, as well as relative humidity, are controlled. In one embodiment, the testing is performed within a maximum range of 15° C. (59° F.) and 35° C. (95° F.), and 35% to 70% relative humidity. In another embodiment, the testing is performed within a maximum range of 20° C. to 25° C. and 40% to 60% RH.

The imaging sensor 312 can be positioned to measure one or more parameters of the volume, height, base diameter, and curvature of the liquid drop 302. A data generator 340 analyzes images 345a, 345b of the liquid drop 302 to measure one or more parameters selected from the group consisting of height, base diameter and curvature of the liquid drop 302. Based upon the analysis, the data generator 340 calculates a volume of the drop 302 based upon the known contact angle and a measured dimension. In one embodiment, the testing device 310 further includes an illuminator 346 such as a laser. The data generator 340 detects via the imaging sensor 312 the geometric characteristic of the liquid drop 302 by illuminating the liquid drop 302 with the illuminator 346.

The testing device 314 may also include an additional source of illumination such as a light emitting diode (LED), laser, fluorescent, incandescent, strobe light, camera flash, or other suitable source of light for illuminating the volume of liquid on the surface of the material. The source of illumination may be incorporated into the housing 320 or may be separate from the housing 320.

The testing device 314 may be operated by a single actuating device, or, where desired, additional actuating devices or user interfaces 350 including a visual display 351 and auditory signaling device 352 could be added to control the device or to input data, such sample information or test parameters. The user interface 350 could include a touch screen, a keypad, a toggle, a button, a rollerball, a wheel, a dial, a mouse, etc. The testing device 314 may include a processor 353 and may optionally entirely contained within the housing 320. The testing device 314 could utilize memory 354 a storage device 356 can store data collected and generated by the testing device 314. The data generator 340 can include a surface substance detection utility 358 that is stored in the storage device 356 and executed by the processor 353. The stored data could be retrieved from the device by known methods, such as wireless transmission to a remote device, storage on removable media (not shown), like a thumb drive or memory chip, and transmission via an electric cable or docking station (not shown). The stored data could have numerous uses such as with quality control and compliance with manufacturing standards and regulations.

The processor 353 is adapted to control and preferably automatically control the operation of the liquid pressurizing system, in particular the pressure with or to which the liquid is pressurized, and, for each of the drop dosing devices, opening and closing of the respective the nozzle valve orifice 334 to apply a drop of the respective liquid, which may advantageously have a defined drop volume, from the outlet of the respective liquid line to the surface in a jet of pressurized liquid. This jet, which is driven by the pressure provided by the liquid pressurizing system, such as by pressurized gas from a compressed gas system, may be delivered as a continuous stream or as a plurality of droplets depending on the properties of the liquid at issue and the flow parameters.

The processor 353 may advantageously be an electronic component, such as a microcontroller, which may be integrated into a common housing with some or all of the remaining components of the apparatus. However, it is, e.g., also possible to provide the processor 353 as a separate computing device, such as a suitably programmed computer or PC, connected to the remainder of the apparatus and not integrated into a common housing with other components of the apparatus.

The testing device 314 enables volume measurement of fluid samples and reagents in minute quantities to enable hand-held bioinstrumentation and diagnostic tools with quicker process speeds. The testing device 314 has uses in the medical, pharmaceutical, chemical, biological diagnostics, environmental testing, food testing, water testing, and other fields. The testing device 314 can be used for an array of antigen-antibody reactions, drug testing, medical and biological diagnostics, and combinatorial chemistry. Other uses of system 30 include inkjet printers, blood-cell-separation equipment, biochemical assays, chemical synthesis, genetic analysis, drug screening, electrochromatography, surface micromachining, laser ablation, and mechanical micromilling. The testing device 314 is easy to manufacture and integrate. The testing device 314 has uses in many fields particularly the medical and biotechnology industries.

The device includes a housing, a liquid dispensing component, position determining component and a data generating component. The liquid dispensing component, which is also referred to herein as the liquid dispenser, is configured to deposit a volume of a liquid on the surface of a substrate material. The position-determining component is configured to obtain information about the position of the device relative to the volume of liquid on the surface. The data generating component, also referred to herein as the data generator, is configured to obtain information about the geometry of the volume of the liquid on the surface of the material.

In one aspect of the invention, the liquid dispenser involves the ballistic deposition of one volume or multiple smaller volumes of liquid to the surface of the material to construct the liquid drop to be measured. This embodiment includes a nozzle in fluid communication with a liquid reservoir. The liquid is pressurized prior to exiting the nozzle and may be pressurized in the reservoir, the nozzle, or in an intermediate stage, such as in a peristaltic pump. Pressurization of the reservoir may be accomplished by a piston or by other pressurization techniques, such as pumps and gas charging. The nozzle may be electrically actuated between an open state and a closed state such that when in the open state the pressurized liquid is dispensed onto the surface of the material through the nozzle, and when in the closed state liquid is not dispensed. This embodiment dispenses pulses of multiple smaller volumes of liquid directed to the same location of the surface of the material to construct the volume of liquid. The amount of energy imparted to the drop affects the final contact angle that is established. Exemplary droplet velocities range from 0.4 to 5.0 meters/second. In one embodiment, droplet velocities range from 0.8 to 3.0 meters/second. These impart total kinetic energies in the range of about 0.1-10 µJ to the drop. In one embodiment, these impart total kinetic energies in the range of about 0.5-2 µJ to the drop.

The smaller volumes of liquid may be on the order of about 10 nl, about 50 nl, about 100 nl, about 200 nl, about 300 nl, or about 400 nl. The smaller volumes are provided in pulses to reach the final volume of liquid, which, in one embodiment, may range from between about 0.5 µl to about 10 µl. In another embodiment, the final volume of liquid may range from between about 1 µl to about 5 µl. In another embodiment, the final volume of liquid is about 2 µl. The volume of liquid may be deposited over a relatively short period of time ranging from about 0.01 seconds to about 1.0 seconds. In one embodiment, the volume of liquid is deposited in about 0.5 seconds or less. Other smaller volumes of liquid and final volumes of liquid, and deposition times may also be used in the presently described devices and methods.

In another embodiment, the liquid dispensing component is an elongated hollow projection having an opening distal to the housing and a fluid reservoir in fluid communication with the hollow projection. Examples of possible elongated hollow projections include syringe needles and pipette tips. The volume of liquid passes from the fluid reservoir, through the hollow projection, and exits the hollow projection at the distal opening where it is deposited onto the surface of the material. The elongated hollow projection may optionally double as the kinetic energy imparting component. For example, the hollow projection may be coupled to a vibration device 360 capable of imparting kinetic energy in the form of vibration to the hollow projection, which in turn imparts the kinetic energy to the volume of liquid. Examples of suitable kinetic energy imparting devices are an electromagnetic transducer, a piezoelectric transducer, an electric motor with an eccentric mass, an acoustical device, and combinations of these devices.

The position determining component determines the position of the device relative to the volume of liquid on the surface by measuring at least one of the distance of the data generating component from the surface of the material or the angle of the data generating component relative to the surface of the material. The position determining component may be as simple as a mechanical probe having a fixed length, which maintains a fixed distance between the data gathering component and the volume of liquid on the surface. In this embodiment, the mechanical probe contacts the surface of the material to maintain the relative position of data generating component. The position determining component may also include a point light source, a laser (not shown), and an acoustical measuring device (not shown).

The use of a point light source, laser, or acoustical measuring device as the position determining component, may allow the device to accurately measure or calculate the contact angles without actually contacting the surface of the material. The point light source illuminates an area on the surface of the material. The shape of the illuminated area will be a conic section. The shape of the illuminated area may be analyzed along with the volume of liquid to calculate the distance from the surface and the angle (a) between the plane of the surface and the data gathering component. The point light source, laser, and acoustical measuring device allow for the construction of a device which merely has to be pointed at the surface from anywhere within a range of distances, such as within a range of about 0.25 inches to about 2 inches, or in a range of about 0.5 inch to about 1.5 inches. The range of distances over which the device may operate is determined by various factors including, for example, the effective ranges of operation for the liquid dispensing component and/or the data generating component.

The data generating component is a device capable of obtaining information about the geometry of the volume of liquid on the surface of the material. The geometric information includes the shape, the contact angle of the lead edge, average contact angle, a diameter (d), the average diameter, and/or the curvature of the volume of liquid on the surface of the material. Exemplary data generating components include a camera, laser, scanner, and/or an acoustical device. The exemplary data generating component illustrated in the figures is a camera. In some embodiments, the data generating component and the position determining component can be included in the same element. For example, a laser or an acoustical device could function as both a data generating component and the position determining component.

The device may also include an additional source of illumination such as a light emitting diode, fluorescent, incandescent, strobe light, camera flash, or other suitable source of light for illuminating the volume of liquid on the surface of the material. The source of illumination may be incorporated into the housing or may be separate from the housing (not shown).

The device may be operated by a single actuating device, or, where desired, additional actuating devices or user interfaces could be added to control the device or to input data, such sample information or test parameters. The user interface could include a touch screen, a keypad, a toggle, a button, a rollerball, a wheel, a dial, a mouse, etc. The electronic circuit may include a processor and may optionally entirely contained within the housing. The electronic circuit could also store data collected and generated by the device. The stored data could be retrieved from the device by known methods, such as wireless transmission to a remote device, storage on removable media (not shown), like a thumb drive or memory chip, and transmission via an electric cable or docking station (not shown). The stored data could have numerous uses such as with quality control and compliance with manufacturing standards and regulations.

The device may further include a display coupled to the electronic circuit for displaying information that includes data and/or an image. The display may include a light emitting diode (which includes both individual and screens of light emitting diodes), a liquid crystal display, and/or a gauge. The display may be located in or on the housing or, may be located in or on a secondary housing o remote device, and coupled to at least a portion of the electronic circuit by at least one of an electrical contact (not shown), electrical cable, and a wireless connection. The display can convey any information deemed relevant to the use of the device such as the surface energy of the surface, a representation of the volume of the liquid on the surface, an image of the volume of the liquid on the surface, a pass indicator, a fail indicator, an error message, a diameter of the volume of the liquid on the surface, an average diameter of the volume of the liquid on the surface, the contact angle formed by the volume of liquid on the surface, the shape of the volume of liquid on the surface, the wetting characteristics of the surface, battery charge, and reservoir volume.

The device may optionally include an auditory signaling device (not shown). The auditory signaling device may be as simple a tone or mixture of tones, or complex as speech. The auditory signaling device may, for example, indicate that the device is in use, that a test was successfully or unsuccessfully completed, a pass or fail indicator, an error, that the device is the correct relative position relative to the surface, battery life, and remaining liquid volume in the reservoir.

Exemplary liquids that may be used with the device and method described here are deionized water, dimethyl sulfoxide (DMSO), mixtures of formamide with glycol monoethyl ether, mixtures of water and ethanol, and other liquids with desirable wetting characteristics.

In one embodiment, contact angle measurements are determined with more than one liquid in order to evaluate surface energy as a multicomponent vector quantities and to obtain a more accurate surface energy calculation.

In one embodiment, energy is imparted to the liquid drop by a microburst of air or other gas rather than another liquid droplet in order to obtain a contact angle that is lower than the advancing angle. As energy is imparted to the drop, a contact angle that is lower than the advancing angle will be established. If sufficient energy is imparted to the drop, the receding contact angle will be established The testing display may include a light emitting diode (which includes both individual and screens of light emitting diodes), a liquid crystal display, and/or a gauge. The display may be located in or on the housing or, may be located in or on a secondary housing or remote device, and coupled to at least a portion of the testing device by at least one of an electrical contact, electrical cable, and a wireless connection. The display can convey any information deemed relevant to the use of the device such as the surface energy of the surface, a representation of the volume of the liquid on the surface, an image of the volume of the liquid on the surface, a pass indicator, a fail indicator, an error message, a diameter of the volume of the liquid on the surface, an average diameter of the volume of the liquid on the surface, the contact angle formed by the volume of liquid on the surface, the shape of the volume of liquid on the surface, the wetting characteristics of the surface, battery charge, and reservoir volume.

The device may optionally include an auditory signaling device. The auditory signaling device may be as simple a tone or mixture of tones, or complex as speech. The auditory signaling device may, for example, indicate that the device is in use, that a test was successfully or unsuccessfully completed, a pass or fail indicator, an error, that the testing device is the correct relative position relative to the surface, battery life, and remaining liquid volume in the reservoir.

All publications, patents and patent applications cited herein, whether supra or infra, are hereby incorporated by reference in their entirety to the same extent as if each individual publication, patent or patent application was specifically and individually indicated as incorporated by reference.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

We claim:

1. A method for intermittent confirmation and adjustment of flow or dispensed volume dispensed from a liquid dispensing apparatus, the method comprising:
   determining an assumed volume to be dispensed by a liquid dispensing apparatus based on pressurizing a liquid to a defined pressure that is dispensed by controlling a nozzle valve orifice to open for a defined interval of time to dispense a droplet having kinetic energy comprising a velocity related to flow rate of the liquid;
   dispensing, by the liquid dispensing apparatus, a drop of liquid, having the assumed volume to be measured, in a non-perpendicular trajectory that separates from the liquid dispensing apparatus prior to being deposited onto a calibrating reference surface with an amount of kinetic energy that defines a deposition condition that is substantially the same as used previously to determine a characteristic contact angle for the calibrating reference surface wherein the amount of kinetic energy establishes a known contact angle with the drop of liquid selected from the group consisting of: (i) an advancing contact angle, (ii) a receding contact angle, and (iii) an intermediate contact angle;
   measuring a dimension of the drop of liquid, wherein the dimension measured is selected from the group consisting of (i) a maximum height of the drop, (ii) a diameter of the contact patch, (iii) radius of curvature, and (iv) cross sectional area;
   calculating the actual volume of the drop of liquid from the relationship of the known contact angle to the measured dimension;
   determining the difference between the assumed volume and the calculated actual volume of the drop of liquid; and
   adjusting the liquid dispensing apparatus for a subsequently dispensed drop of liquid to correct for the difference between the calculated actual volume and the assumed volume.

2. The method of claim 1, further comprising repositioning one of the liquid dispensing apparatus and the calibrating reference surface after confirmation and adjustment to enable the liquid dispensing apparatus to dispense drops of liquid on another substrate for a purpose other than measuring a volume of the drops of liquid.

3. The method of claim 1, wherein the volume of the drop of liquid is calculated from a relationship of a known contact angle to the measured dimension and establishes (i) an advancing contact angle, (ii) a receding contact angle, and (iii) an intermediate contact angle by varying the kinetic energy imparted to the deposited liquid drop.

4. The method of claim 3, wherein the correcting for the difference between the calculated actual volume of liquid dispensed by the liquid dispensing apparatus and the assumed volume comprises adjusting the volume of actual liquid dispensed by the test apparatus to correct for the difference.

5. The method of claim 4, wherein the adjusting the volume of actual liquid dispensed by the liquid dispensing apparatus to correct for the difference is by adjusting the degree of opening of one or more valves.

6. The method of claim 4, wherein the adjusting the volume of actual liquid dispensed by the liquid dispensing apparatus to correct for the difference is by adjusting the pressure provided by the liquid dispensing apparatus to the dispensing liquid.

7. The method of claim 4, wherein the adjusting the volume of actual liquid dispensed by the liquid dispensing apparatus to correct for the difference is by adjusting the time interval during which one or more valves is opened.

8. The method of claim 7, wherein the liquid dispensing apparatus comprises:
   a liquid dispensing component; a dimension determining component; and a processor component, wherein:
   the liquid dispensing component is configured to deposit a volume of a liquid on the surface of the material;
   the dimension determining component is configured to determine one or more dimensions of a liquid deposited on the surface; and
   the processor component is configured to analyze information based on the dimension determining component about one or more geometrical features of the volume of the liquid on the surface of the material.

9. The method of claim 8, further comprising:
repeatedly dispensing one or more additional drops of liquid in a non-perpendicular trajectory each deposited on different areas of the calibrating reference surface; and
averaging respective values of a difference between the assumed volume and the calculated actual volume of each drop of liquid measured from a plurality of areas of the calibrating reference surface.

10. The method of claim 9, where the calibrating reference surface comprises a substrate coated with an ink, polymer, metal or other coating that has a consistent predetermined contact angle.

11. A liquid dispensing apparatus calibration system comprising:
a calibrating reference surface that is previously tested with a test volume of liquid imparted with a test amount of kinetic energy that defines a deposition condition to determine a characteristic contact angle of the calibrating reference surface;
a liquid dispensing apparatus that that dispenses a drop of the liquid, having an assumed volume to be measured, in a non-perpendicular trajectory that separates from the liquid dispensing apparatus prior to being deposited onto the calibrating reference surface the test amount of kinetic energy that is substantially the same as the deposition condition; and
a testing apparatus for intermittent confirmation and adjustment of the liquid dispensing apparatus, the testing apparatus comprising:
a dimension determining component that determines one or more dimensions of the liquid drop deposited on the calibrating reference surface; and
a processor component communicatively coupled to the dimension determining component and which:
determines an assumed volume to be dispensed by a liquid dispensing apparatus based on pressurizing a liquid to a defined pressure that is dispensed by controlling a nozzle valve orifice to open for a defined interval of time to dispense a droplet having kinetic energy comprising a velocity related to flow rate of the liquid;
determines the known characteristic contact angle for the calibrating reference surface based at least in part on the velocity of the liquid drop;
determines an actual calculated volume of the drop of liquid based on the one or more dimensions of the drop of liquid and the known characteristic contact angle;
determines the difference between the assumed volume and the calculated actual volume of the drop of liquid; and
adjusts the liquid dispensing apparatus to correct for the difference between the calculated actual volume and the assumed volume for a subsequently dispensed drop of liquid.

12. The liquid dispensing apparatus calibration system of claim 11, wherein one of the liquid dispensing apparatus and the calibrating reference surface is repositionable after confirmation and adjustment to enable the liquid dispensing apparatus to dispense drops of liquid on another substrate for a purpose other than measuring a volume of the drops of liquid.

13. The liquid dispensing apparatus calibration system of claim 11, wherein the dimension measured is selected from the group consisting of (i) a maximum height of the drop, (ii) a diameter of the contact patch, (iii) radius of curvature, and (iv) cross sectional area.

14. The liquid dispensing apparatus calibration system of claim 13 wherein the processor component is adapted to calculate the volume of the drop of liquid from the relationship of a known contact angle to the measured dimension and establishes (i) an advancing contact angle, (ii) a receding contact angle, and (iii) an intermediate contact angle by varying the kinetic energy imparted to the deposited liquid drop.

15. The liquid dispensing apparatus calibration system of claim 14 wherein the processor component determines a difference between the volume of dispensed liquid and an expected volume level.

16. The liquid dispensing apparatus calibration system of claim 14 wherein the processor component transmits an adjustment signal to a nozzle valve coupled to the liquid dispensing component, the signal adjusting the one or more parameters so as to cause the nozzle to dispense a volume of liquid approximating the expected volume level.

17. The liquid dispensing apparatus calibration system of claim 14 wherein the processor component controllably adjusts the operation of the liquid dispensing component by adjusting one or more parameters of the system selected from the group consisting of adjusting the time interval during which one or more nozzle valves is opened, the degree of opening of one or more nozzle valves and/or the pressure provided by the liquid dispensing apparatus to the dispensing liquid.

18. The liquid dispensing apparatus calibration system of claim 14 wherein the processor component calibrates, for each of the liquid dispensing components, the drop volume by adjusting the time interval during which one or more nozzle valves is opened, the degree of opening of the one or more nozzle valves and/or the pressure provided by the liquid pressurizing system according to the calculated volume of a drop deposited onto a calibrating reference surface.

19. The liquid dispensing apparatus calibration system of claim 14 wherein:
the liquid dispensing apparatus repeatedly dispenses one or more additional drops of liquid in a non-perpendicular trajectory each deposited on different areas of the calibrating reference surface; and the processor component calculates an average of measured liquid volumes for the drops of liquid over a plurality of areas of the one or more substrate.

20. The liquid dispensing apparatus calibration system of claim 14, wherein the liquid dispensing apparatus dispenses at the non-perpendicular trajectory onto the calibrating reference surface with the amount of kinetic energy is in a kinetic energy range from 0.1-10 micro-Joules (gJ) for a liquid drop that is in a volume range of 0.1-5 micro-liters (Pl).

21. A method of determining a volume of a droplet of liquid dispensed from a liquid dispensing apparatus, the method comprising:
determining an assumed volume to be dispensed by a liquid dispensing apparatus based on pressurizing a liquid to a defined pressure that is dispensed by controlling a nozzle valve orifice to open for a defined interval of time to dispense a droplet having kinetic energy comprising a velocity of the drop related to flow rate of the liquid;
depositing an assumed volume of liquid to be measured from the liquid dispensing apparatus as a drop that separates from the liquid dispensing apparatus prior to being deposited onto a calibrating reference surface, wherein the calibrating reference surface provides for a known contact angle with the drop of liquid under the deposition conditions used comprising the velocity of the drop that is non-perpendicular to the calibrating surface;

establishing a known contact angle with the drop of liquid selected from the group consisting of: (i) an advancing contact angle, (ii) a receding contact angle, and (iii) an intermediate contact angle;

measuring a dimension of the drop of liquid, wherein the dimension measured is selected from the group consisting of (i) a maximum height of the drop, (ii) a diameter of the contact patch, (iii) radius of curvature, and (iv) cross sectional area; and calculating the actual volume of the drop of liquid from the relationship of the known contact angle to the measured dimension, wherein (i) an advancing contact angle, (ii) a receding contact angle, and (iii) an intermediate contact angle are established by varying the kinetic energy imparted to the deposited liquid drop.

22. The method of claim 21, further comprising:

determining the difference between the assumed volume and the calculated actual volume of the drop of liquid; and correcting for the difference between the calculated actual volume of liquid dispensed by the liquid dispensing apparatus and the assumed volume; wherein the correcting for the difference between the calculated actual volume of liquid dispensed by the liquid dispensing apparatus and the assumed volume comprises adjusting the volume of actual liquid dispensed by the test apparatus to correct for the difference in a subsequently dispensed drop.

23. The method of claim 22, wherein the adjusting the volume of actual liquid dispensed by the liquid dispensing apparatus to correct for the difference is by adjusting the time interval during which one or more valves is opened, the degree of opening of one or more valves and/or the pressure provided by the liquid dispensing apparatus to the dispensing liquid.

* * * * *